US007983811B2

United States Patent
Basir et al.

(10) Patent No.: US 7,983,811 B2
(45) Date of Patent: Jul. 19, 2011

(54) VEHICLE VISUAL AND NON-VISUAL DATA RECORDING SYSTEM

(75) Inventors: Otman A. Basir, Kitchener (CA);
Fakhreddine Karray, Waterloo (CA);
Kristopher Desrochers, Guelph (CA);
Jean-Pierre Bhavnani, Waterdown (CA); David Bullock, Guelph (CA);
Inam Rahim, Waterloo (CA)

(73) Assignee: Intelligent Mechatronic Systems Inc., Ontario (CA)

( * ) Notice: Subject to any disclaimer, the term of this patent is extended or adjusted under 35 U.S.C. 154(b) by 0 days.

(21) Appl. No.: 12/627,545

(22) Filed: Nov. 30, 2009

(65) Prior Publication Data

US 2010/0076646 A1    Mar. 25, 2010

Related U.S. Application Data

(60) Division of application No. 12/136,241, filed on Jun. 10, 2008, now abandoned, which is a continuation of application No. 10/352,385, filed on Jan. 27, 2003, now Pat. No. 7,386,376.

(60) Provisional application No. 60/351,968, filed on Jan. 25, 2002.

(51) Int. Cl.
*G06F 19/00* (2011.01)
(52) U.S. Cl. .............................. 701/35; 340/439; 701/30
(58) Field of Classification Search .................. 701/30, 701/35; 340/439
See application file for complete search history.

(56) References Cited

U.S. PATENT DOCUMENTS

| 3,818,491 A | * | 6/1974 | Skovgaard .................... 346/21 |
| 4,188,618 A | | 2/1980 | Weisbart |
| 4,500,868 A | * | 2/1985 | Tokitsu et al. ................ 340/439 |
| 4,533,962 A | | 8/1985 | Decker et al. |
| 4,817,040 A | * | 3/1989 | Bodley-Scott .................. 701/35 |
| 4,843,463 A | | 6/1989 | Michetti |
| 4,843,578 A | * | 6/1989 | Wade ............................ 702/142 |
| 4,939,652 A | | 7/1990 | Steiner |
| 4,992,943 A | * | 2/1991 | McCracken .................... 701/35 |
| 5,303,163 A | * | 4/1994 | Ebaugh et al. ................ 700/274 |
| 5,359,528 A | * | 10/1994 | Haendel et al. ................. 701/35 |

(Continued)

*Primary Examiner* — John Q Nguyen
*Assistant Examiner* — Brian J Broadhead
(74) *Attorney, Agent, or Firm* — Carlson, Gaskey & Olds, PC

(57) ABSTRACT

The system described in this invention can be used for monitoring and analyzing real time visual and non-visual information pertaining to the occupant, vehicle, and surroundings prior to, during and post eccentric operating conditions for a given period of time. The system stores vehicle and occupant data from sensors throughout the vehicle and also makes use of existing vehicle sensors that may already be present in the vehicle. The invention also includes a video recording module that makes use of a fish-eye camera to capture video from the inside and the outside of the vehicle. Real-time data analysis is performed to detect and to recognize vehicle occupants, and recognize impending eccentric events. Vehicle, occupant, and video data are stored in circular buffers. When an eccentric event, a collision for example, has been detected, the device continues to record data and video for a fixed period of time. Once this time has elapsed, the data is transferred from volatile to non-volatile memory for later retrieval. A computer may be used to retrieve and display the vehicle and occupant data in a synchronization with the video data for the purposes of accident recreation, driver or vehicle monitoring.

14 Claims, 5 Drawing Sheets

U.S. PATENT DOCUMENTS

| | | | |
|---|---|---|---|
| 5,430,432 A * | 7/1995 | Camhi et al. .................. 340/438 |
| 5,797,134 A | 8/1998 | McMillan et al. |
| 5,798,458 A | 8/1998 | Monroe |
| 5,815,093 A | 9/1998 | Kikinis |
| 5,857,159 A * | 1/1999 | Dickrell et al. ................. 701/35 |
| 6,014,602 A | 1/2000 | Kithil et al. |
| 6,088,635 A | 7/2000 | Cox et al. |
| 6,141,611 A | 10/2000 | Mackey et al. |
| 6,185,490 B1 | 2/2001 | Ferguson |
| 6,246,933 B1 | 6/2001 | Bague |
| 6,298,290 B1 | 10/2001 | Abe et al. |
| 6,356,823 B1 * | 3/2002 | Iannotti et al. ................. 701/35 |
| 6,389,340 B1 | 5/2002 | Rayner |
| 6,542,795 B2 * | 4/2003 | Obradovich et al. ............. 701/1 |
| 6,556,905 B1 * | 4/2003 | Mittelsteadt et al. ........... 701/35 |
| 6,704,434 B1 | 3/2004 | Sakoh et al. |
| 6,748,305 B1 * | 6/2004 | Klausner et al. ................ 701/35 |
| 6,865,457 B1 * | 3/2005 | Mittelsteadt et al. ........... 701/35 |
| 7,039,507 B2 * | 5/2006 | Hagenbuch ..................... 701/29 |
| 2002/0005895 A1 | 1/2002 | Freeman et al. |
| 2002/0021751 A1 | 2/2002 | Bolcioni et al. |
| 2002/0022927 A1 | 2/2002 | Lemelson et al. |
| 2002/0105438 A1 | 8/2002 | Forbes et al. |
| 2002/0135679 A1 | 9/2002 | Scaman |
| 2002/0198640 A1 * | 12/2002 | Gehlot et al. ................... 701/35 |
| 2003/0025793 A1 | 2/2003 | McMahon |
| 2003/0053536 A1 | 3/2003 | Ebrami |
| 2003/0090376 A1 | 5/2003 | Thompson et al. |
| 2003/0095688 A1 | 5/2003 | Kirmuss |
| 2004/0040772 A1 | 3/2004 | Ertl et al. |

* cited by examiner

VEHICLE VISUAL AND NON-VISUAL DATA RECORDING SYSTEM

This application is a divisional of U.S. application Ser. No. 12/136,241, filed on Jun. 10, 2008 now abandoned, which is a continuation of U.S. application Ser. No. 10/352,385, filed on Jan. 27, 2003 now U.S. Pat. No. 7,386,376, which claims priority to U.S. Provisional Ser. No. 60/351,968 filed Jan. 25, 2002.

BACKGROUND OF THE INVENTION

Transportation systems and networks are vital in our society. Business shipments, product deliveries, and commuters, are just a few examples of the thousands of uses of our transportation systems. It is well known that these systems are often delayed due to accidents, particularly ones that rely on automotive routes. These delays cause traffic build-ups that result in much wasted time and frustration.

On-scene investigations are time consuming and are not always accurate. Often, investigators must rely on witness statements and approximations to assess the events leading up to the accident and to determine who is at fault. It is therefore difficult to guarantee the correctness of these assessments.

Insurance companies use these assessments to determine who must pay for the damage after an accident has occurred. Incorrect assessments lead to thousands of dollars being spent unnecessarily by the insurance companies whose clients were not at fault.

Clearly, a system capable of recording, reproducing and analyzing information pertaining to an accident is very valuable. Traffic delays due to accident investigations could be decreased since less investigation time would be required. Investigations would be much more accurate since the system will provide precise data prior to, during, and after the accident. Additionally, insurance companies will benefit due to improved investigation assessments. Other devices have been proposed as visual/non-visual vehicular data recorders, however, they fall short in several areas.

Numerous vehicular data recording systems have been proposed which combine audio/video data, and vehicle performance data. Examples include U.S. Pat. No. 6,389,340 to Rayner, U.S. Pat. No. 6,246,933 to Baque, US Patent 2002/135,679 to Scaman, U.S. Pat. No. 6,298,290 to Takeshi, and U.S. Pat. No. 4,843,463 to Michetti. Each of these systems are primarily data logging systems, in which the data recording process is triggered by a sudden vehicle acceleration or other accident-anticipation system. Some systems, such as the one proposed in US Patent 2002/105,438 to Forbes et al., also make use of basic biometric signals to anticipate an accident or incident that should be recorded. Upon triggering of the recording mechanism, some of these systems attempt to transfer the video and vehicular data to a form of non-volatile memory. However, many of these systems, such as U.S. Pat. No. 4,843,463 to Michetti and US Patent 2002/135,679 to Scaman, are restricted to auxiliary memory devices such as tapes and hard disks. Some systems, such as U.S. Pat. No. 6,141,611 to Mackey et al., automatically transfer the collected data to a remote central data system for distribution to authorized parties. Viewing of the recorded information requires the use of cumbersome external hardware or physical extraction of the storage medium. In addition, these systems rely largely on analysis of the vehicle data by trained personnel, and provide minimal interface capabilities for an automobile owner.

The previously discussed patent documents suggest systems that record primarily vehicle performance/status data, and video data. No occupant data is explicitly recorded. Rather, extraction of meaningful occupant data (e.g. number of occupants, occupant position, occupant size) can only be gathered through expert, post-incident analysis of the video data.

Most existing video recording systems require multiple conventional cameras, often placed in intrusive locations within the vehicle compartment. The patent documents discussed above makes no use of the visual data to infer occupant position, to anticipate eccentric conditions, or to determine the nature of the vehicle's occupants.

Existing patents suggest systems with minimal in-vehicle interfaces. Interface to the recorded data is limited primarily to post-incident analysis by trained personnel using specialized hardware and software. Existing offline interface systems often require qualified personnel to analyze the captured data in order to reconstruct the sequence of events prior to an accident or other incident.

Other systems currently in use are meant for the purpose of surveillance and tracking certain vehicles. These systems are either mountable on a fixed structure such as traffic signals or bridges or on a building near an intersection. The portable systems are usually mounted on law enforcement vehicles and are again used for the purpose of surveillance and monitoring other vehicles.

SUMMARY OF THE INVENTION

The sensor system of the invention herein proposed is unique from existing video/vehicle data recording systems, both in terms of functionality and possible applications. The set of sensors employed in this device is unique as it incorporates traditional vehicle data sensors, novel occupant status sensors, video information, and biometric sensors in order to anticipate an impending eccentric condition, and to maintain a complete record of the vehicle and occupant status prior to an event.

Traditional vehicle sensors such as speed, engine diagnostics, brake position, accelerator position, GPS co-ordinates, and traction control system data are continuously recorded. Additionally, non-traditional data sensors are used that maintain a record of events such as occupant position/height/weight, cellular phone use, and child seat presence. Biometric sensors (such as a heart beat monitor) are used to log indicators of the driver's awareness. Finally, video sensors are used to maintain a visual record of in-vehicle and out-of-vehicle events, and to visually recognize conditions that may lead to an eccentric condition, such as driver drowsiness/distraction, passengers being out of their seat, or an impending exterior collision. The video sensor outlined in this document can make use of a fish-eye lens system to capture a 360-degrees image of the surrounding environment. This set of vehicle and occupant sensors, and the use of video data in both an active and passive manner, is unique in comparison to existing visual/non-visual data recording systems.

The invention outlined in this document describes a system with a sophisticated in-vehicle interface for use by occupants and would-be buyers, a computer interface for offline analysis by drivers, parents, and company supervisors, and a remote interface capable of signaling emergency response centers with pertinent location and occupant information in the case of an accident. The in-vehicle interface device allows occupants to recall vehicle performance statistics and to interface with a GPS/Traffic Monitoring system. In addition to monitoring standard vehicle performance statistics, the device can be set to sound an audio alarm when the vehicle is in excess of the legal speed limit. The speed limit is determined by way of the GPS co-ordinate data, or through a manual setting. A speech recognition system can be used to set the speed limit alarm options and parameters. Using the GPS data, and the remote connection to traffic monitoring systems, the occupants may also access advance visual and non-visual traffic information in order to better plan their route. The in-vehicle interface device can also be used by potential vehicle purchasers to access vehicle usage information, such as the number of times the airbag has deployed, or the number of times the vehicle has been in excess of 130 km/h.

Many patents describe systems in which a computer monitor must be transferred to the vehicle and plugged into the system to view the captured data, or removal of the storage medium all together, should a review of the recorded information be required. This system provides a unique mechanism for in-vehicle viewing of recorded information. Additionally, the end-use functionality of the interface system is unique as no other patent describes a system that integrates a data recording system with traffic monitoring, navigational aids, and in-vehicle review of usage statistics for potential buyers.

The computer interface allows offline analysis of vehicle routes and vehicle performance. This could be of enormous benefit to parents who wish to monitor their child's vehicle usage, or company supervisors who are attempting to monitor employee use of company vehicles. This invention can be used with multidimensional, virtual reality, accident recreation software that converts physical measurements of the vehicle and occupant into a media that is viewable and understandable by the average law enforcement officer and home user.

This interface system, which combines an in-vehicle interface, a computer interface, and a remote interface, is unique in comparison to the interface systems described in prior patent documents, both in terms of functionality and possible end-use applications.

Other benefits of a data recording system for vehicles include; assisting medical agencies in determining treatment for accident-related injuries and acting as a deterrent to reckless driving. This is particularly pertinent to young drivers borrowing their parent's vehicles. Beyond applications of offline monitoring and incident investigation are a wealth of in-vehicle applications which utilize vehicle and occupant sensors. A sensory data recording system could provide information in real-time to alert drivers if they become drowsy or are driving in excess of the legal speed limit. The system can also act as a navigational aid when used in co-ordination with GPS data and a remote traffic monitoring system.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
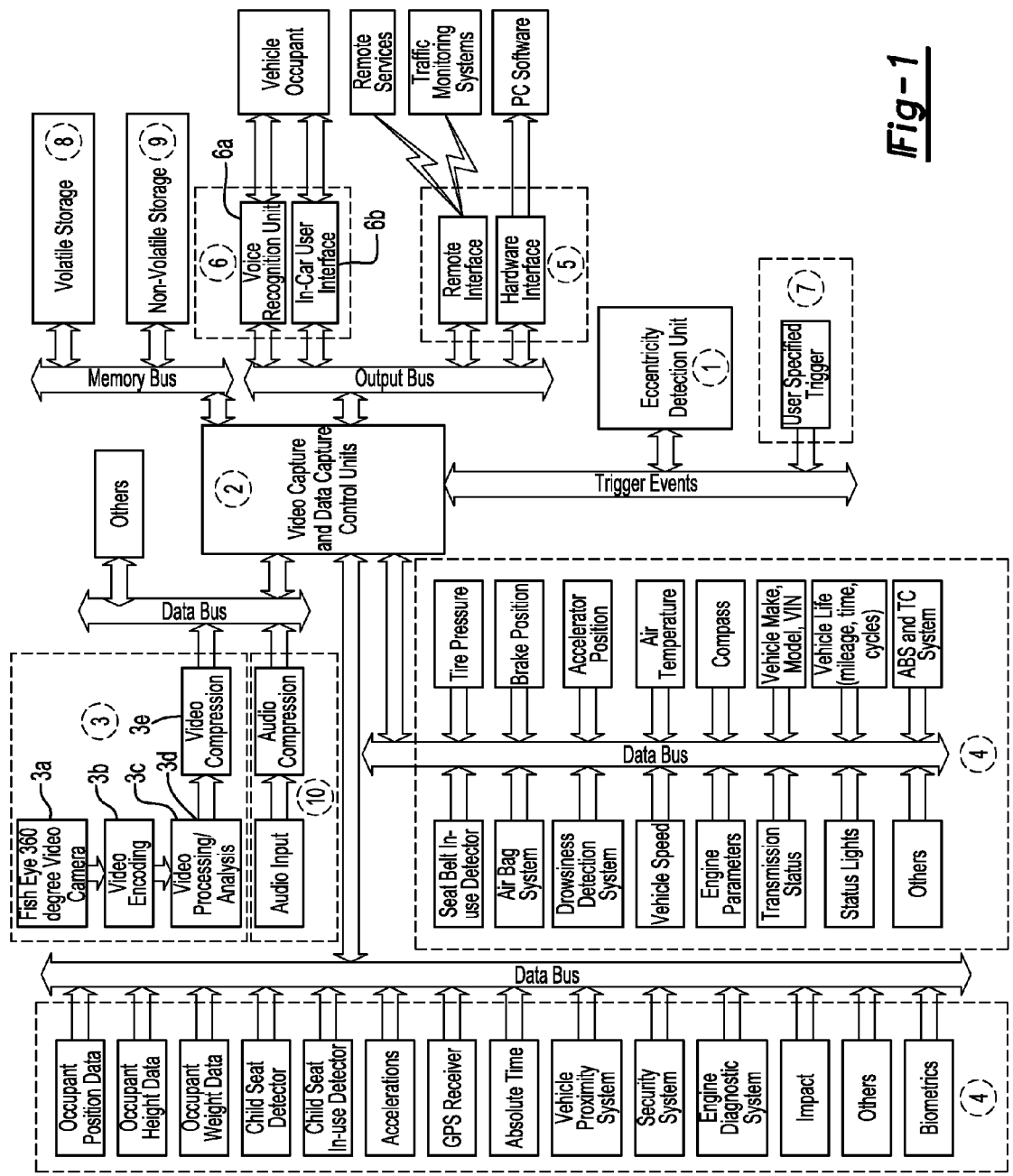
FIG. 1. Shows the vehicle visual and non-visual data recording system block diagram.

FIG. 1 shows an overview of the entire system. Referring to FIG. 1, the invention is composed of an eccentricity detection unit (1), video capture and data capture control units (2), an in-vehicle interface unit (6) with voice recognition (6a) and a user-interface (6b), and remote vehicle monitoring software. The data and video capture units (2) both store data before, during and after an eccentric state has been detected. This system can be installed at the time of vehicle production or as an after-market addition.

Figure 2:
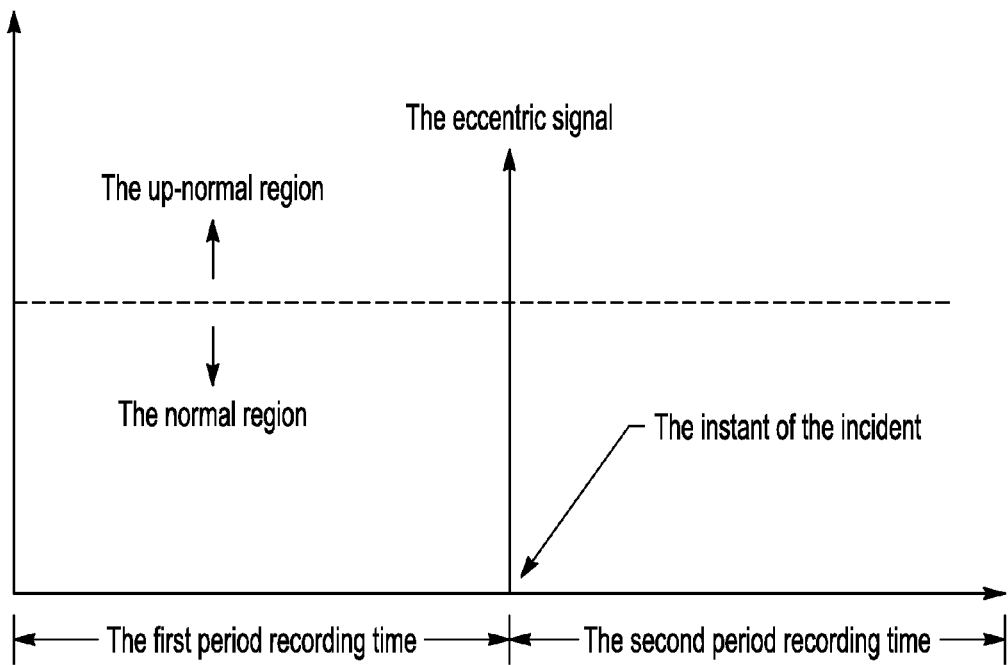
FIG. 2. Shows the relationship between the eccentricity incident and the recording time.

The system's eccentricity detection unit (1) uses sensors including the fish-eye camera (3) and non-visual occupant and vehicle data sensors (4), including biometric sensors, and impact sensors to detect any up-normality with respect to predefined normal operating conditions. An eccentric-state signal is sent to the control units (2) of the data capture module and video capture unit when it has detected an up-normality. The control units of the data capture and video capture modules then continue to record their respective data for a fixed period of time. The data from each module is transferred from volatile memory (8) to non-volatile memory (9) once this time period has elapsed. FIG. 2 shows the relationship between the eccentricity incident and the recording time.

Figure 3:
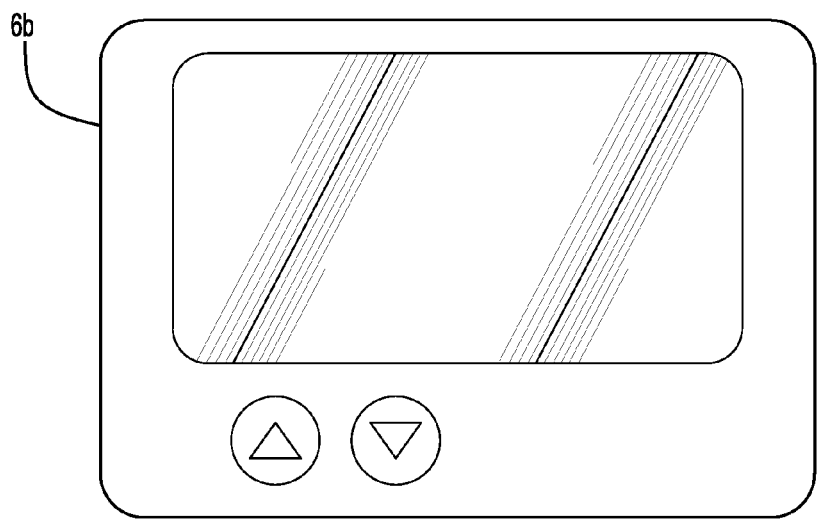
FIG. 3. Depicts a possible in-vehicle mounted interface.

Biometric sensors, such as a heartbeat monitor embedded in the steering wheel, are of use in recognizing a state of stress or drowsiness in the driver. An impending eccentric condition can also be detected through analysis of the video data. Driver distraction, rowdy in-vehicle passenger behavior, or an impending exterior vehicle collision can be recognized from the video data as a state of instability. When an impending eccentric condition is detected the driver can be warned via an audio alert message, or the data/video capture units may be alerted as to the up-normality condition. FIG. 3 shows a possible in-vehicle interface (6) configuration.

The video capture module comprises a control unit (2), camera (3a), video encoder (3b), video processor (3c), video analyzer (3d) and video compressor (3e) (combined), and storage (8)(9). The storage is large enough to store several seconds of video and is composed of both volatile (8) and non-volatile memory (9).

Figure 4:
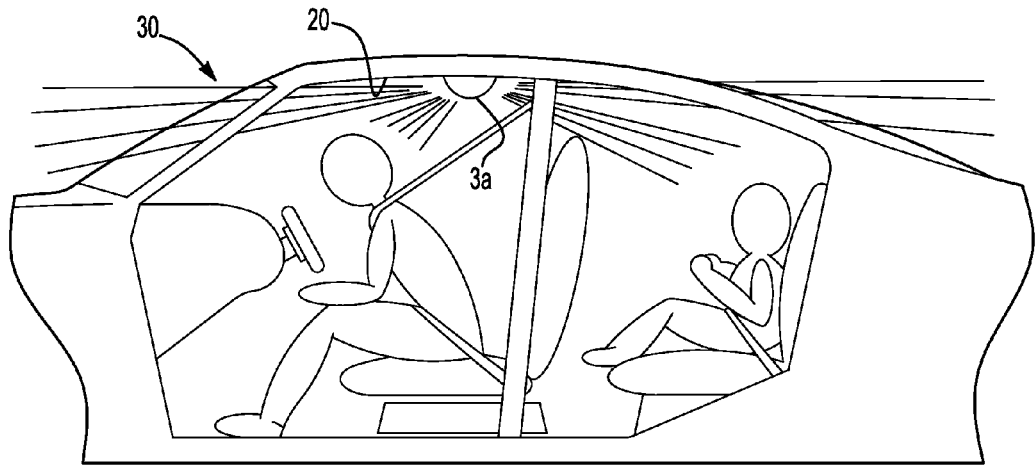
FIG. 4. Shows a fish-eye camera mounted in the vehicle headliner.

The video capture module's camera (3a) preferably makes use of a "fish-eye" lens that provides a 360-degree view. This 360-degree fish eye camera (3a) may be mounted in the headliner (20) of the vehicle (30), as shown in FIG. 4. In this position, a view of the inside and the outside of the vehicle (30) can be recorded. The video footage is passed to the video encoder (3b) to digitally encode the data. The video processor (3c) is then responsible for undoing the distortion resulting from the fish-eye lens, normalizing temporally variant interior illumination, and recovering usable imagery from night-time and low-lighting conditions. This video data is then sent to the video analyzer (3d) within the Eccentricity Detection Unit for analysis of potentially impending eccentric conditions, and to the video compressor (3e). The video analyzer (3d) is also responsible for updating some of the occupant status indicators. Visual information from the camera (3a) can be used to infer the number of occupants, occupant ID, and occupant position. The vision-based occupant measurements are then fused with other occupant sensors, such as weight sensors and position sensors, to update the occupant status indicators.

Figure 5:
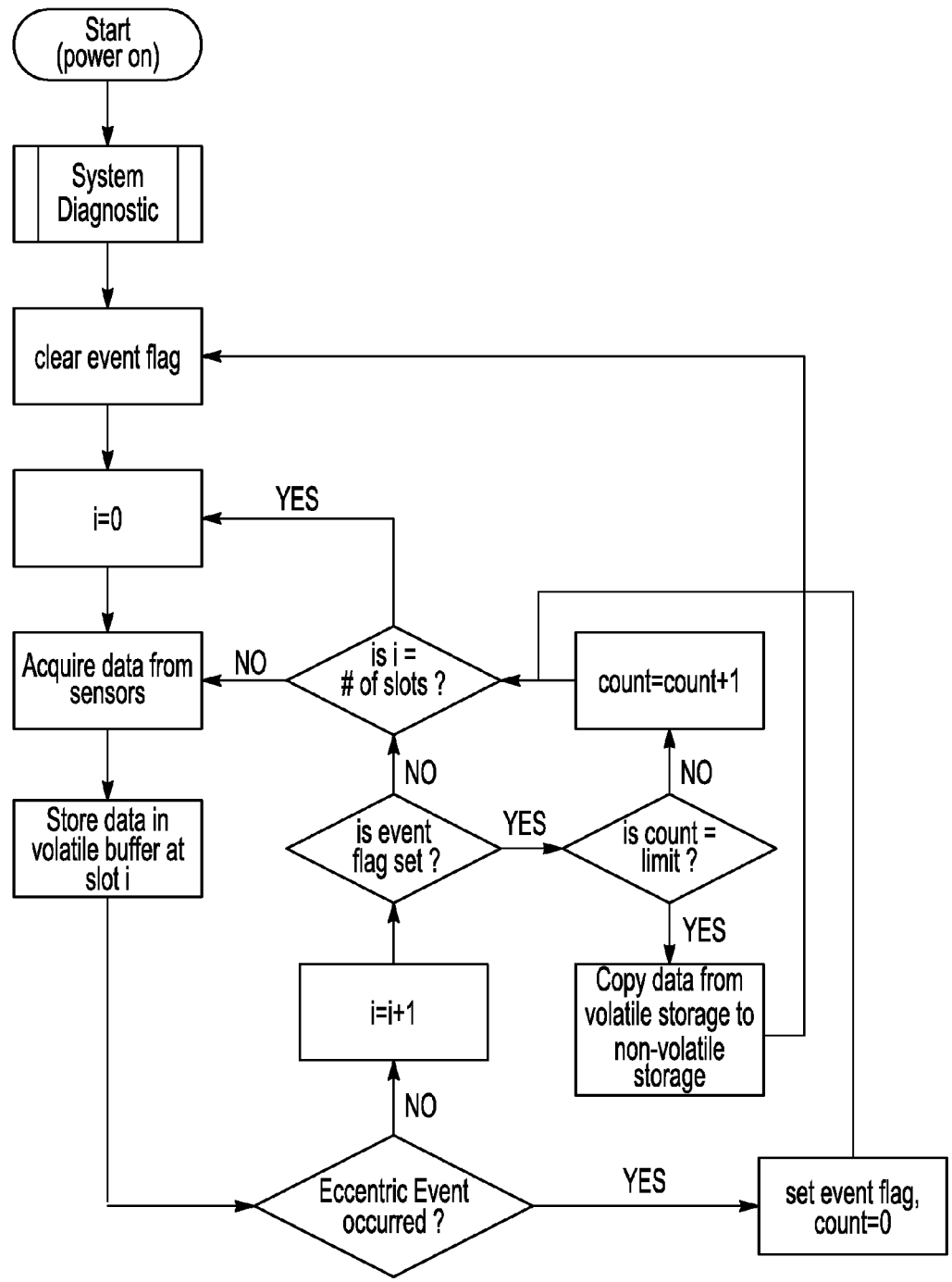
FIG. 5. Shows the circular buffer storage and volatile to non-volatile transfer process flowchart used for both the video and data capture.

The video compressor (3e) is required to reduce the amount of memory necessary to store the video. The compressed video is then placed in volatile memory (8) in a circular buffer. The circular buffer continuously overwrites the oldest data with newer incoming data such that a fixed length of video is always stored. FIG. 5 describes the circular buffer storage and transfer of volatile memory to non-volatile memory when an eccentric event has been detected.

The video capture module control unit's software (2) stamps the video data so that when the data is retrieved, it will be possible to have synchronized playback with the non-visual vehicle and occupant data (captured by the data capture module).

When the control unit is triggered with an eccentric event signal generated by the eccentricity detection unit (1), the video capture module continues recording for a fixed length of time. Once this time has elapsed the stored video is copied from volatile (8) to non-volatile memory (9), for permanent storage.

The data capture module consists of a control unit (2), an interface to the existing vehicle sensor system (4), an interface to additional occupant and vehicle sensors (4), volatile storage (8), and non-volatile storage (9). Sensors (4) are placed throughout the vehicle to gather vehicle and occupant data. In some cases, the data capture module may make use of the existing vehicle sensory system interface and simply retrieve the data from the vehicle's existing sensors (4). This prevents redundant sensors from being installed in the vehicle unnecessarily. However, additional occupant sensors (e.g. weight and position sensors) and bio-metric sensors (e.g. heartbeat sensors) can be added to the vehicle for an increasingly complete record log of the vehicle's occupants, and for use in anticipation of eccentric conditions. Similar to the video capture module, the non-visual data is stamped so that synchronized playback with the video is possible. As with the video data, a data inference algorithm is applied to the captured data in an attempt to anticipate an impending eccentric condition. This can include statistical analysis of occupant sensors, accelerometers, and biometric signals.

The data capture module may gather (but is not limited to) the following pieces of vehicle and occupant data (4): occupant position data, occupant height data, occupant weight data, accelerations, GPS location of vehicle, absolute time, vehicle proximity, child seat presence, cellular phone in use, security system data, engine diagnostics, seat belt in use, airbag data, driver drowsiness data, heart-beat sensors, vehicle speed, engine parameters, transmission status, status lights, tire pressure, brake position, accelerator position, air temperature, compass direction, vehicle make, model and VIN, vehicle life statistics, antilock brake system data, impact data and traction control system data. Known variations of each of these sensors are suitable for use in the present invention.

When combined, this data provides a very accurate and complete view of the conditions prior to, during and post eccentric events.

The data capture module's storage system (8) (9) is the same as the video capture module and can be seen in FIG. 5. The data is stored in a circular buffer, replacing the oldest data with the newest, in volatile storage (8). As with the video capture module, when the control unit (2) of the data capture module is triggered with an eccentric event signal, the system continues to record for a fixed period of time and once this time has elapsed, the stored data is copied from volatile memory (8) to non-volatile memory (9), for permanent storage.

In addition, the data capture module is capable of recording significant events and statistics that have occurred pertaining to the vehicle over any given period of time. This is useful for vehicle owners who have lent their vehicle to others, or potential buyers of used vehicles. This data may be retrieved for the last day, month, year or lifetime of the vehicle, and is accessible with the in-vehicle interface device or through the external computer interface software. The data capture module may gather but is not limited to the following vehicle events and statistics:

Unsafe driving conditions: Maximum speed ever attained by the vehicle, number of times the speed of the vehicle went over 130 km/h, number of times the vehicle experienced hard "cornering," number of times the vehicle experienced large accelerations of decelerations, number of time the vehicle neared the point of rollover.

Care of the vehicle: number of impacts over a specified acceleration, number of hours or km the vehicle was run with low oil, number of hours or km the vehicle was run with the engine overheated, number of hours or km the vehicle was run post required oil change, number of hours or km the vehicle was run with check the engine light on, number of times engine RPM exceed the vehicle's "red line."

This data is stored directly in non-volatile storage (9) and is updated immediately after one of the events or statistics changes.

The occupant of the vehicle may choose to store events permanently for later retrieval at any time by using the user-trigger (7). This trigger simulates the occurrence of an eccentric event, and therefore causes the control units (2) of the data capture and video capture modules to continue recording for a fixed period of time, and then transfer the contents of the volatile (8) memory to the non-volatile memory (9).

Figure 3A:
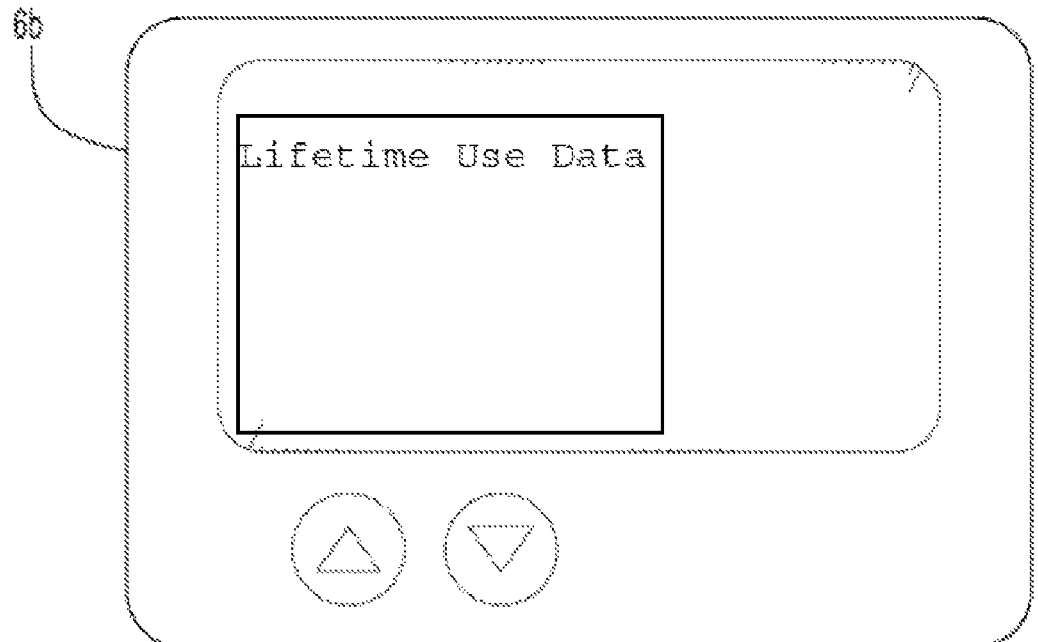
FIG. 3A schematically shows the interface of FIG. 3 displaying Life Use Data.
Figure 3B:
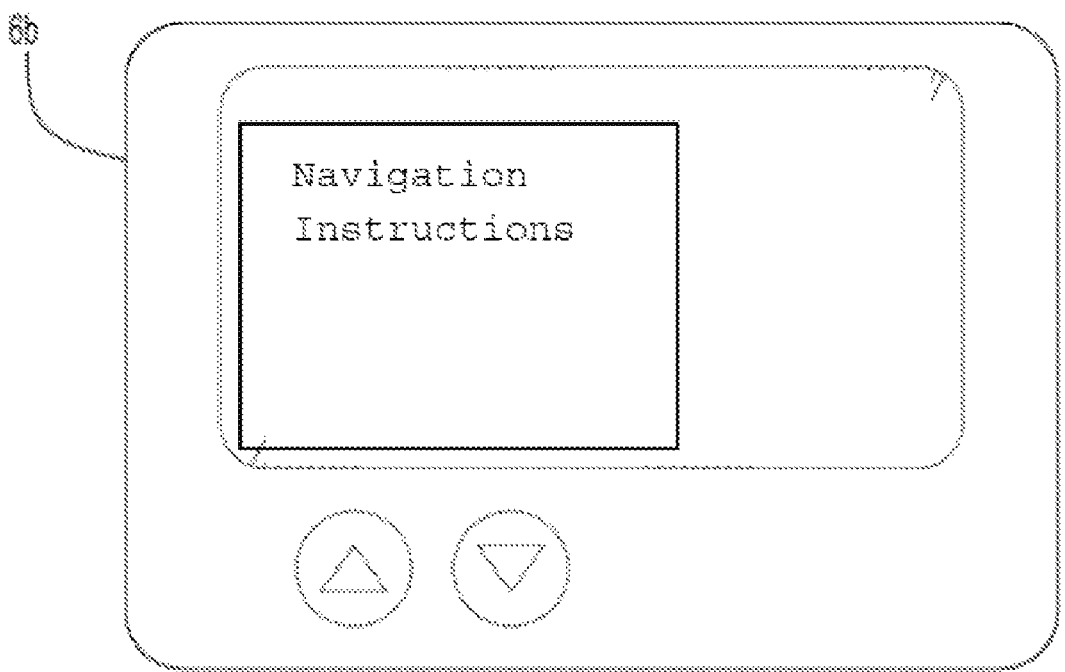
FIG. 3B schematically shows the interface of FIG. 3 displaying Navigation Instructions.

A possible in-vehicle interface (6b) is depicted in FIG. 3. This device can be used to display certain information stored by the data capture module. In addition to acting as a mechanism for viewing vehicle performance statistics (FIG. 3A), the in-vehicle interface can be used in co-ordination with the GPS system and a wireless remote connection in order to act as a navigational aid (FIG. 3B). The in-vehicle interface can provide audio and visual instructional guidance to a pre-defined destination using the GPS information. An option also exists for using the GPS information to give the user an audio alert when they have exceeded the legal speed limit. A speech recognition module will also be incorporated to act as an input mechanism for querying the interface device and supplying speed limit information. As well, utilizing the GPS co-ordinate data, and remote systems which provide traffic monitoring information, users can query the device as to the traffic conditions ahead. This will allow the user to see live pictures of the traffic density at specified freeway locations, and to transmit an image of road conditions around the vehicle to a specific location.

Figure 6:
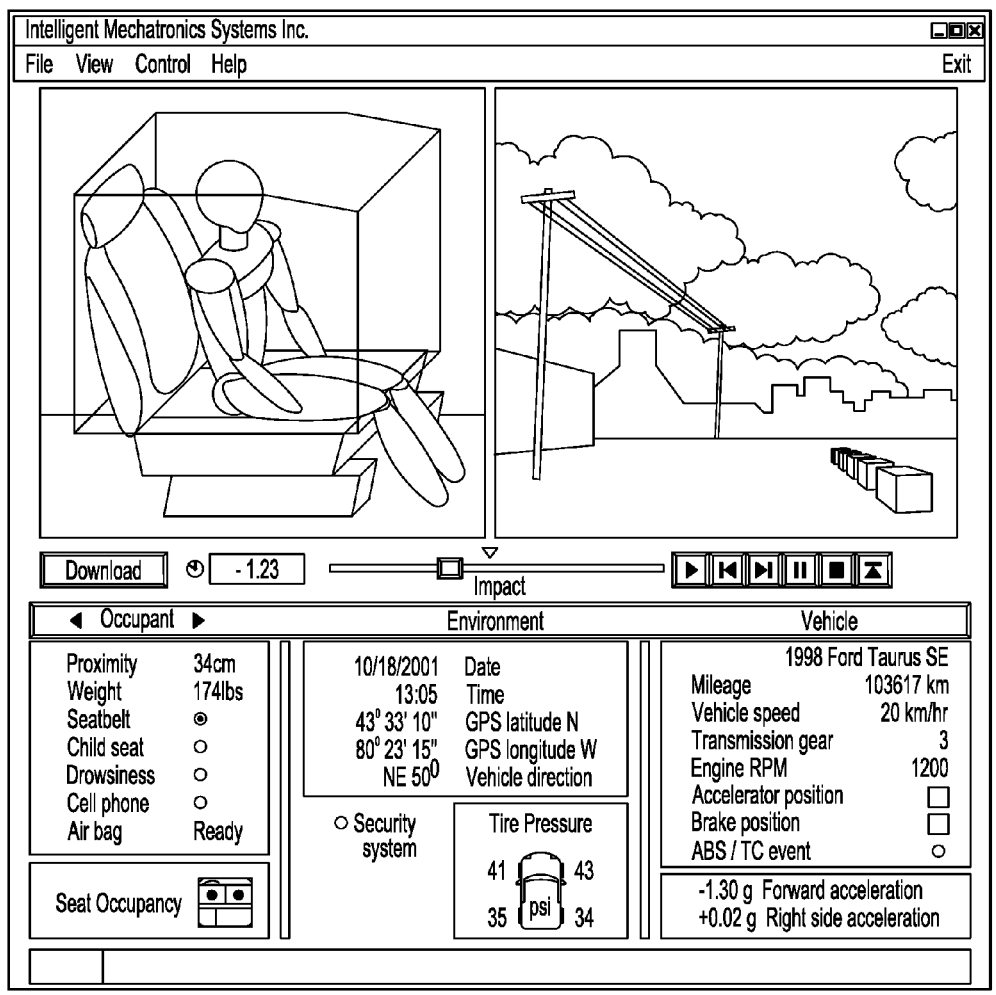
FIG. 6. Shows a sample screenshot of computer Software that can be used with the invention.

A computer interface (5) is provided so that recorded data can be viewed and analyzed on a computer. The data capture module's control unit (2) is responsible for transmitting the captured video and data from the non-volatile storage (9) to the computer. Transfer of information from the vehicle to a personal computer can be accomplished through direct connection of a portable computer to the vehicle with data cables, wireless transmission from the vehicle to a central server, or saving the information to a removable storage medium. The computer software can be used to download and recreate the events stored by the invention and view the statistics of the vehicle's use. For accident recreation purposes, a multi-dimensional virtual modeling system can be used to render a graphical rendition of the occupant and vehicle events that occurred prior to an accident. This creates a graphical illustration of the incident that is understandable to the average law enforcement officer or vehicle owner. FIG. 6 shows a sample screenshot of the recreation software and several pieces of downloaded vehicle information. Additionally, a remote interface (5) is also provided, this can be used to signal emergency response centers in the case of an accident. Occupant information can also be transmitted through this interface to assist medical teams prior to their departure. This remote interface also acts as a method of transmitting data from the vehicle to the central server. Collecting vehicle data records at a central server enables remote vehicle monitoring (real-time and offline). This also allows for users to view vehicle data via the internet when away from their personal computer.

In all cases, the system can be programmed to restrict the viewable data for certain users. Vehicle owners and potential vehicle buyers can be restricted to the vehicle history and performance, whereas insurance companies may be restricted to the vehicle's dynamics, orientation, and surroundings prior to, during and post collision.

Optionally, along with video data, it is possible to capture audio data. This embodiment of the system works with the video capture module, and also stores the audio data in a circular buffer. Additional volatile and non-volatile storage (8)(9) is necessary to store the additional data. As with the video and data capture modules, the contents of the volatile storage (8) is transferred to the non-volatile storage (9) when a fixed period of recording time has elapsed after an eccentric event has occurred. The software algorithms on the video module's control unit (2) perform this process.

Access to the captured video, vehicle, and occupant data can be accomplished through several methods: removal of a physical storage medium, direct download, and wireless transmit. Removal of a physical storage medium involves the download of the captured data to a temporary storage device. This storage device can then be brought to a computer where the data is analyzed. Direct download consists of bringing a portable computer to the vehicle and attaching a transmit cable for direct download from the vehicle's storage device to the computer hard drive. Wireless transmit consists of a wireless transmittal of the captured data to a central networked server, or to a nearby stand-alone computer.

What is claimed is:

1. An in-vehicle recording system comprising:
a plurality of occupant sensors in the vehicle capturing occupant data, including occupant position;
a video capture module recording video data inside and outside the vehicle;
a data recorder in the vehicle, the data recorder recording vehicle data, the occupant data and the video data and synchronizing the occupant data with the video data, wherein the video data is synchronized with the occupant data from the plurality of occupant sensors; and
an in-vehicle display that displays data recorded by the data recorder, wherein the vehicle data includes vehicle lifetime use data that can be displayed by the in-vehicle display, wherein the vehicle lifetime use data is based upon occurrences of unsafe driving conditions.

2. The in-vehicle recording system of claim 1 wherein the vehicle data includes GPS location.

3. The in-vehicle recording system of claim 1 wherein the vehicle data includes accelerator position.

4. The in-vehicle recording system of claim 1 wherein the vehicle data includes brake position.

5. The in-vehicle recording system of claim 1 wherein the display displays the video data and the occupant data from the occupant sensors, and wherein the occupant data from the occupant sensors is synchronized with the video data on the display.

6. The in-vehicle recording system of claim 5 wherein the occupant sensors determine the number of occupants in the vehicle and report the number of occupants in the vehicle to the data recorder.

7. The in-vehicle recording system of claim 6 wherein the occupant sensors determine positions of occupants in the vehicle and report the positions of the occupants in the vehicle to the data recorder.

8. The in-vehicle recording system of claim 7 wherein the occupant sensors determine the size of at least one of the plurality of occupants in the vehicle and report the size of the at least one occupant in the vehicle to the data recorder.

9. The in-vehicle recording system of claim 8 wherein the occupant sensors determine a drowsiness level of the at least one occupant in the vehicle and report the drowsiness level to the data recorder.

10. An in-vehicle recording system comprising:
a plurality of occupant sensors in the vehicle capturing occupant data, including occupant position;
a video capture module recording video data inside and outside the vehicle;
a data recorder in the vehicle, the data recorder recording vehicle data, the occupant data and the video data and synchronizing the occupant data with the video data, wherein the video data is synchronized with the occupant data from the plurality of occupant sensors; and
an in-vehicle display that displays data recorded by the data recorder, wherein the vehicle data includes vehicle lifetime use data that can be displayed by the in-vehicle display, wherein the vehicle lifetime use data is based upon number of times that the speed of the vehicle exceeded a threshold.

11. An in-vehicle recording system comprising:
a plurality of occupant sensors in the vehicle capturing occupant data, including occupant position;
a video capture module recording video data inside and outside the vehicle;
a data recorder in the vehicle, the data recorder recording vehicle data, the occupant data and the video data and synchronizing the occupant data with the video data, wherein the video data is synchronized with the occupant data from the plurality of occupant sensors; and
an in-vehicle display that displays data recorded by the data recorder, wherein the vehicle data includes vehicle lifetime use data that can be displayed by the in-vehicle display, wherein the vehicle lifetime use data is based upon number of times that the vehicle experienced large accelerations.

12. An in-vehicle recording system comprising:
a plurality of occupant sensors in the vehicle capturing occupant data, including occupant position;
a video capture module recording video data inside and outside the vehicle;
a data recorder in the vehicle, the data recorder recording vehicle data, the occupant data and the video data and synchronizing the occupant data with the video data, wherein the video data is synchronized with the occupant data from the plurality of occupant sensors; and
an in-vehicle display that displays data recorded by the data recorder, wherein the vehicle data includes vehicle lifetime use data that can be displayed by the in-vehicle display, wherein the vehicle lifetime use data reflects low-oil conditions.

13. An in-vehicle recording system comprising:
a data recorder;
a GPS receiver;
a plurality of vehicle sensors in the vehicle capturing vehicle data and sending the vehicle data to the data recorder; and
a display in the vehicle for displaying the vehicle data from the data recorder and for displaying information from the GPS receiver, wherein the display displays navigation instructions based upon the information from the GPS receiver, wherein the vehicle data includes vehicle lifetime use data that can be displayed by the in-vehicle display, wherein the vehicle lifetime use data is based upon occurrences of unsafe driving conditions.

14. The in-vehicle recording system of claim 13 wherein the vehicle lifetime use data is based upon number of times that the speed of the vehicle exceeded a threshold.

* * * * *